US010384682B2

(12) United States Patent
Braunberger et al.

(10) Patent No.: US 10,384,682 B2
(45) Date of Patent: Aug. 20, 2019

(54) ABSOLUTE ACCELERATION SENSOR FOR USE WITHIN MOVING VEHICLES

(71) Applicant: Vision Works IP Corporation, Sequim, WA (US)

(72) Inventors: Alfred S. Braunberger, Sequim, WA (US); Beau M. Braunberger, Upland, CA (US)

(73) Assignee: Vision Works IP Corporation, Sequim, WA (US)

( * ) Notice: Subject to any disclaimer, the term of this patent is extended or adjusted under 35 U.S.C. 154(b) by 0 days.

(21) Appl. No.: 15/425,888

(22) Filed: Feb. 6, 2017

(65) Prior Publication Data

US 2017/0205236 A1 Jul. 20, 2017

Related U.S. Application Data

(60) Continuation of application No. 15/176,033, filed on Jun. 7, 2016, now Pat. No. 9,834,215, which is a
(Continued)

(51) Int. Cl.
*G06F 7/70* (2006.01)
*G06G 7/00* (2006.01)
(Continued)

(52) U.S. Cl.
CPC ......... *B60W 30/18* (2013.01); *B60G 17/0162* (2013.01); *B60G 17/0195* (2013.01);
(Continued)

(58) Field of Classification Search
None
See application file for complete search history.

(56) References Cited

U.S. PATENT DOCUMENTS 3,725,921 A  4/1973 Weidman et al.
3,846,749 A  11/1974 Curry
(Continued)

FOREIGN PATENT DOCUMENTS

DE  102005006528 A1  8/2004
JP  1107496 A  10/1973
(Continued)

OTHER PUBLICATIONS

Veovodsky, John, "Evaluation of a Declaration Warning Light for Reducing Rear-End AutomobileCollisions," Journal of Applied Psychology, 1974, vol. 59, No. 3, pp. 270-273.
(Continued)

*Primary Examiner* — Bhavesh V Amin
(74) *Attorney, Agent, or Firm* — Haverstock & Owens LLP

(57) ABSTRACT

A method of and system for detecting absolute acceleration along various axes relative to a desired movement vector while moving relative to a gravity source includes steps of determining a vertical acceleration, perpendicular to the desired movement vector and substantially anti-parallel to a gravitational acceleration due to the gravity source; determining a longitudinal acceleration, parallel to the desired movement vector and to output at vertical acceleration signal and a longitudinal acceleration signal; determining an inclination of the desired movement vector relative to the gravitational acceleration; and processing the vertical acceleration signal, the longitudinal acceleration signal, and the inclination signal to produce an absolute vertical acceleration signal and an absolute longitudinal acceleration signal.

18 Claims, 9 Drawing Sheets

Related U.S. Application Data continuation of application No. 14/263,629, filed on Apr. 28, 2014, now Pat. No. 9,381,902, which is a continuation of application No. 13/897,209, filed on May 17, 2013, now Pat. No. 8,725,380, which is a continuation of application No. 11/821,352, filed on Jun. 21, 2007, now Pat. No. 8,532,896, which is a division of application No. 11/243,364, filed on Oct. 3, 2005, now Pat. No. 7,239,953.

(60) Provisional application No. 60/616,400, filed on Oct. 5, 2004.

(51) Int. Cl.
| | |
|---|---|
| B60W 30/18 | (2012.01) |
| B60Q 1/44 | (2006.01) |
| B60T 17/22 | (2006.01) |
| B60W 10/06 | (2006.01) |
| B60W 10/22 | (2006.01) |
| G01C 21/16 | (2006.01) |
| G01C 21/18 | (2006.01) |
| G01P 15/14 | (2013.01) |
| G01C 21/28 | (2006.01) |
| G01S 19/07 | (2010.01) |
| G01S 19/49 | (2010.01) |
| B60W 40/107 | (2012.01) |
| B60W 40/109 | (2012.01) |
| B60W 40/11 | (2012.01) |
| B60W 50/14 | (2012.01) |
| B60G 17/019 | (2006.01) |
| B60T 7/22 | (2006.01) |
| B60T 8/171 | (2006.01) |
| G01P 15/18 | (2013.01) |
| G01P 21/00 | (2006.01) |
| B60G 17/016 | (2006.01) |
| B60G 17/0195 | (2006.01) |
| G01S 19/53 | (2010.01) |

(52) U.S. Cl.
CPC ........ *B60G 17/01908* (2013.01); *B60Q 1/44* (2013.01); *B60Q 1/447* (2013.01); *B60T 7/22* (2013.01); *B60T 8/171* (2013.01); *B60T 17/22* (2013.01); *B60W 10/06* (2013.01); *B60W 10/22* (2013.01); *B60W 40/107* (2013.01); *B60W 40/109* (2013.01); *B60W 40/11* (2013.01); *B60W 50/14* (2013.01); *G01C 21/165* (2013.01); *G01C 21/18* (2013.01); *G01C 21/28* (2013.01); *G01P 15/14* (2013.01); *G01P 15/18* (2013.01); *G01P 21/00* (2013.01); *G01S 19/07* (2013.01); *G01S 19/49* (2013.01); *B60G 2400/104* (2013.01); *B60G 2401/28* (2013.01); *B60G 2600/044* (2013.01); *B60G 2800/0124* (2013.01); *B60T 2201/022* (2013.01); *B60T 2210/36* (2013.01); *B60T 2260/06* (2013.01); *B60W 2420/905* (2013.01); *B60W 2510/0604* (2013.01); *B60W 2510/182* (2013.01); *B60W 2520/105* (2013.01); *B60W 2550/142* (2013.01); *B60W 2550/402* (2013.01); *B60W 2710/06* (2013.01); *B60W 2710/22* (2013.01); *B60W 2710/226* (2013.01); *G01S 19/53* (2013.01)

(56) References Cited

U.S. PATENT DOCUMENTS

| | | |
|---|---|---|
| 3,877,299 A | 4/1975 | Clayton |
| 4,195,328 A | 3/1980 | Harris, Jr. |
| 4,344,139 A | 8/1982 | Miller et al. |
| 4,349,233 A | 9/1982 | Bullard et al. |
| 4,361,871 A | 11/1982 | Miller et al. |
| 4,402,142 A | 5/1983 | Hayashi |
| 4,515,124 A | 5/1985 | Hayashi |
| 4,542,460 A | 9/1985 | Weber |
| 4,779,696 A | 10/1988 | Harada et al. |
| 4,976,330 A | 12/1990 | Matsumoto |
| 5,017,904 A | 5/1991 | Browne et al. |
| 5,314,037 A | 5/1994 | Shaw et al. |
| 5,381,135 A | 1/1995 | Blount |
| 5,453,662 A | 9/1995 | Gottlieb |
| 5,473,306 A | 12/1995 | Adell |
| 5,572,449 A | 11/1996 | Qing |
| 5,589,817 A | 12/1996 | Furness |
| 5,594,414 A | 4/1997 | Namngani |
| 5,617,199 A | 4/1997 | Dunne |
| 5,654,890 A * | 8/1997 | Nicosia ............... G01C 21/165 701/16 |
| 5,657,025 A * | 8/1997 | Ebner ................. G01C 21/165 342/442 |
| 5,678,650 A | 10/1997 | Ishihara et al. |
| 5,742,923 A * | 4/1998 | Odagawa ............. G01C 21/30 340/988 |
| 5,770,999 A | 6/1998 | Rhodes |
| 5,831,162 A | 11/1998 | Sparks et al. |
| 5,856,620 A | 1/1999 | Okada |
| 5,874,904 A | 2/1999 | Hirabayashi |
| 5,923,286 A * | 7/1999 | Divakaruni .......... G01C 21/165 342/357.44 |
| 5,940,026 A * | 8/1999 | Popeck ................ G01S 5/0247 342/357.36 |
| 6,020,814 A | 2/2000 | Robert |
| 6,023,221 A | 2/2000 | Michelotti |
| 6,073,070 A | 6/2000 | Diekhans |
| 6,085,133 A | 7/2000 | Keuper et al. |
| 6,097,156 A | 8/2000 | Diep |
| 6,167,347 A * | 12/2000 | Lin ..................... G01C 21/165 342/357.29 |
| 6,233,515 B1 | 5/2001 | Engelman et al. |
| 6,278,945 B1* | 8/2001 | Lin ..................... G01C 21/165 701/472 |
| 6,298,931 B1 | 10/2001 | Easton |
| 6,317,683 B1* | 11/2001 | Ciprian ................ G01C 21/30 701/118 |
| 6,351,211 B1 | 2/2002 | Bussard |
| 6,408,245 B1* | 6/2002 | An ..................... G01C 21/165 340/450 |
| 6,411,204 B1 | 6/2002 | Bloomfield et al. |
| 6,417,764 B2 | 7/2002 | Tonkin |
| 6,417,767 B1 | 7/2002 | Carlson et al. |
| 6,424,915 B1* | 7/2002 | Fukuda ................ G01C 21/165 701/13 |
| 6,459,369 B1 | 10/2002 | Wang |
| 6,502,033 B1* | 12/2002 | Phuyal ................ G01C 21/30 340/988 |
| 6,512,976 B1* | 1/2003 | Sabatino .............. G01C 21/005 342/357.36 |
| 6,525,652 B2 | 2/2003 | Smith |
| 6,525,656 B1 | 2/2003 | Hahn |
| 6,556,908 B1 | 4/2003 | Lu et al. |
| 6,600,414 B2 | 7/2003 | Foo et al. |
| 6,647,328 B2 | 11/2003 | Walker |
| 6,697,736 B2* | 2/2004 | Lin ..................... G01C 21/165 342/357.3 |
| 6,710,709 B1 | 3/2004 | Morin et al. |
| 6,753,769 B1 | 6/2004 | Elliot |
| 6,765,495 B1 | 7/2004 | Dunning et al. |
| 6,802,573 B2 | 10/2004 | Eberling |
| 6,850,156 B2 | 2/2005 | Bloomfield et al. |
| 6,856,883 B2 | 2/2005 | Taylor |
| 6,870,474 B1 | 3/2005 | Brothers |
| 6,876,945 B2* | 4/2005 | Emord ................. G01C 21/165 702/150 |
| 7,077,549 B1 | 7/2006 | Corliss |
| 7,104,364 B2 | 9/2006 | Godlewsky et al. |
| 7,193,559 B2* | 3/2007 | Ford .................... G01C 21/165 342/357.32 |

(56) References Cited

U.S. PATENT DOCUMENTS

| | | | |
|---|---|---|---|
| 7,239,953 B2 | 7/2007 | Braunberger | |
| 7,248,964 B2* | 7/2007 | Bye | G01C 21/165 |
| | | | 342/357.31 |
| 7,259,357 B2 | 8/2007 | Walker | |
| 7,412,329 B2 | 8/2008 | Urai et al. | |
| 7,418,345 B2 | 8/2008 | Diebold et al. | |
| 7,425,903 B2 | 9/2008 | Boss et al. | |
| 7,427,929 B2 | 9/2008 | Bauer et al. | |
| 7,529,609 B2 | 5/2009 | Braunberger et al. | |
| 7,548,173 B2 | 6/2009 | Tengler et al. | |
| 7,554,435 B2 | 6/2009 | Tengler et al. | |
| 7,782,227 B2 | 8/2010 | Boss et al. | |
| 8,000,871 B2 | 8/2011 | Braunberger et al. | |
| 8,155,847 B2 | 4/2012 | Wang | |
| 8,315,769 B2 | 11/2012 | Braunberger et al. | |
| 8,428,839 B2 | 4/2013 | Braunberger et al. | |
| 8,437,935 B2 | 5/2013 | Braunberger et al. | |
| 8,508,441 B2 | 8/2013 | Kimura | |
| 8,532,896 B2 | 9/2013 | Braunberger et al. | |
| 8,571,776 B2 | 10/2013 | Braunberger et al. | |
| 8,682,558 B2 | 3/2014 | Braunberger | |
| 8,941,482 B1 | 1/2015 | Gouverneur | |
| 9,079,471 B1 | 7/2015 | Arends | |
| 9,230,439 B2 | 1/2016 | Boulay | |
| 9,399,450 B2 | 7/2016 | Raste | |
| 9,834,215 B2* | 12/2017 | Braunberger | B60Q 1/447 |
| 9,855,986 B2* | 1/2018 | Braunberger | B62J 6/02 |
| 2001/0056544 A1 | 12/2001 | Walker | |
| 2002/0133282 A1 | 9/2002 | Ryan et al. | |
| 2002/0154514 A1 | 10/2002 | Yagi | |
| 2002/0171542 A1 | 11/2002 | Bloomfield et al. | |
| 2003/0006886 A1 | 1/2003 | Gabbard | |
| 2003/0006890 A1 | 1/2003 | Magiawala | |
| 2003/0039123 A1 | 2/2003 | Crisick | |
| 2003/0133306 A1 | 7/2003 | Kakizoe et al. | |
| 2003/0138131 A1 | 7/2003 | Stam | |
| 2003/0151502 A1 | 8/2003 | Kam | |
| 2003/0201885 A1 | 10/2003 | Currie | |
| 2004/0049324 A1 | 3/2004 | Walker | |
| 2004/0077459 A1 | 4/2004 | Hase | |
| 2004/0090314 A1 | 5/2004 | Iwamoto | |
| 2004/0105264 A1 | 6/2004 | Spero | |
| 2004/0139034 A1 | 7/2004 | Farmer | |
| 2004/0140143 A1 | 7/2004 | Saeki et al. | |
| 2004/0160315 A1 | 8/2004 | Speckhart et al. | |
| 2004/0167702 A1 | 8/2004 | Isogai et al. | |
| 2004/0215393 A1 | 10/2004 | Matsumoto | |
| 2004/0222918 A1 | 11/2004 | Kakishita et al. | |
| 2005/0004760 A1 | 1/2005 | Urai et al. | |
| 2005/0047113 A1 | 3/2005 | Nishimura | |
| 2005/0135081 A1 | 6/2005 | Ishiguro | |
| 2005/0141232 A1 | 6/2005 | Chon | |
| 2005/0156722 A1 | 7/2005 | McCall | |
| 2005/0156727 A1 | 7/2005 | Golder | |
| 2005/0162106 A1 | 7/2005 | Cho | |
| 2005/0200467 A1 | 9/2005 | Au | |
| 2005/0207619 A1 | 9/2005 | Lohmann | |
| 2005/0223762 A1 | 10/2005 | Yammamoto | |
| 2005/0232469 A1 | 10/2005 | Schofield | |
| 2005/0248446 A1 | 11/2005 | Watabe et al. | |
| 2006/0025897 A1 | 2/2006 | Shostak et al. | |
| 2006/0026017 A1 | 2/2006 | Walker | |
| 2006/0041372 A1 | 2/2006 | Kubota | |
| 2006/0072914 A1 | 4/2006 | Arai et al. | |
| 2006/0074540 A1* | 4/2006 | Braunberger | B60Q 1/447 |
| | | | 701/70 |
| 2006/0206246 A1 | 9/2006 | Walker | |
| 2007/0052530 A1 | 3/2007 | Diebold et al. | |
| 2007/0063824 A1 | 3/2007 | Gaddy | |
| 2007/0135979 A1 | 6/2007 | Plante | |
| 2007/0135980 A1 | 6/2007 | Plante | |
| 2007/0136078 A1 | 6/2007 | Plante | |
| 2007/0159318 A1 | 7/2007 | Roser | |
| 2007/0175680 A1 | 8/2007 | Gouker | |
| 2007/0188348 A1 | 8/2007 | Bauer et al. | |
| 2007/0205882 A1 | 9/2007 | Erhlich et al. | |
| 2007/0219685 A1 | 9/2007 | Plante | |
| 2007/0233337 A1 | 10/2007 | Plishner | |
| 2007/0252723 A1 | 11/2007 | Boss et al. | |
| 2008/0082261 A1 | 4/2008 | Tengler et al. | |
| 2008/0091309 A1 | 4/2008 | Walker | |
| 2008/0111666 A1 | 5/2008 | Plante et al. | |
| 2008/0120175 A1 | 5/2008 | Doering | |
| 2008/0122603 A1 | 5/2008 | Plante et al. | |
| 2008/0122605 A1 | 5/2008 | Tengler et al. | |
| 2008/0122652 A1 | 5/2008 | Tengler | |
| 2008/0147266 A1 | 6/2008 | Plante et al. | |
| 2008/0147267 A1 | 6/2008 | Plante et al. | |
| 2008/0183344 A1 | 7/2008 | Doyen et al. | |
| 2008/0183825 A1 | 7/2008 | Alicherry et al. | |
| 2008/0270021 A1 | 10/2008 | Yamada | |
| 2008/0288192 A1 | 11/2008 | Kumar et al. | |
| 2008/0316053 A1 | 12/2008 | Boss et al. | |
| 2009/0040073 A1 | 2/2009 | Bootes | |
| 2009/0066641 A1 | 3/2009 | Mahajan | |
| 2009/0118960 A1 | 5/2009 | Harrison | |
| 2009/0125170 A1 | 5/2009 | Noffsinger et al. | |
| 2009/0140887 A1 | 6/2009 | Breed | |
| 2009/0147966 A1 | 6/2009 | McIntosh et al. | |
| 2009/0157255 A1 | 6/2009 | Plante | |
| 2009/0189756 A1 | 7/2009 | Wu | |
| 2009/0242284 A1 | 10/2009 | Whestone, Jr. | |
| 2009/0242285 A1 | 10/2009 | Whestone, Jr. | |
| 2009/0261963 A1 | 10/2009 | Ault | |
| 2009/0262189 A1 | 10/2009 | Marman | |
| 2010/0063736 A1 | 3/2010 | Hoetzer | |
| 2010/0217507 A1 | 8/2010 | Braunberger et al. | |
| 2010/0318258 A1 | 12/2010 | Katayama et al. | |
| 2010/0332074 A1 | 12/2010 | Brigshella et al. | |
| 2010/0332101 A1 | 12/2010 | Braunberger et al. | |
| 2011/0050102 A1 | 3/2011 | Le Bars et al. | |
| 2011/0105955 A1 | 5/2011 | Yudovsky et al. | |
| 2011/0145042 A1 | 6/2011 | Green et al. | |
| 2011/0153174 A1 | 6/2011 | Roberge | |
| 2011/0187559 A1 | 8/2011 | Applebaum | |
| 2011/0199199 A1 | 8/2011 | Perkins | |
| 2011/0210666 A1 | 9/2011 | Shiao | |
| 2012/0075117 A1 | 3/2012 | Kaiser | |
| 2012/0089299 A1 | 4/2012 | Breed | |
| 2012/0155098 A1 | 6/2012 | Kasaba | |
| 2012/0203557 A1 | 8/2012 | Odinak | |
| 2012/0240571 A1 | 9/2012 | Otsuka | |
| 2013/0133306 A1 | 5/2013 | Qiu | |
| 2013/0184979 A1 | 7/2013 | Karandikar | |
| 2013/0241412 A1 | 9/2013 | Ooba | |
| 2014/0118132 A1 | 5/2014 | Braunberger et al. | |
| 2014/0150521 A1* | 6/2014 | Jacobson | G01C 25/00 |
| | | | 73/1.38 |
| 2014/0361687 A1 | 12/2014 | Olson et al. | |
| 2015/0061492 A1 | 3/2015 | Braunberger | |
| 2015/0062935 A1 | 3/2015 | Braunberger | |
| 2015/0062936 A1 | 3/2015 | Braunberger | |
| 2017/0205236 A1* | 7/2017 | Braunberger | B60Q 1/447 |

FOREIGN PATENT DOCUMENTS

| | | |
|---|---|---|
| JP | 1030854 A | 2/1989 |
| JP | 1111550 A | 4/1989 |
| JP | 7137577 A | 5/1989 |
| JP | 1145247 A | 6/1989 |
| JP | 01173660 A | 7/1989 |
| JP | 06262978 A | 9/1994 |
| JP | 07205717 A | 8/1995 |
| JP | 08310296 A | 11/1996 |
| JP | 9039655 A | 2/1997 |
| JP | 2001030826 A | 2/2001 |
| JP | 2001206145 A | 7/2001 |
| JP | 2001213232 A | 8/2001 |
| JP | 2002240624 A | 8/2002 |
| JP | 2003200782 A | 7/2003 |

(56) References Cited

FOREIGN PATENT DOCUMENTS

| | | |
|---|---|---|
| JP | 2005096723 A | 4/2005 |
| JP | 2005145333 A | 6/2005 |
| JP | 2006182172 A | 7/2006 |

OTHER PUBLICATIONS

Moore et al., Historical Development and Current Effectiveness of Rear Lighting Systems, Univ. of Mich. 1999, pp. 1-80.
European Search Report from EP Application No. 07839779.1.

* cited by examiner

ABSOLUTE ACCELERATION SENSOR FOR USE WITHIN MOVING VEHICLES

RELATED APPLICATION

This application is a continuation of co-pending U.S. patent application Ser. No. 15/176,033, filed on Jun. 7, 2016, and entitled "ABSOLUTE ACCELERATION SENSOR FOR USE WITHIN MOVING VEHICLES" which is a continuation of co-pending U.S. patent application Ser. No. 14/263,629, filed on Apr. 28, 2014, and entitled "ABSOLUTE ACCELERATION SENSOR FOR USE WITHIN MOVING VEHICLES", now patented as U.S. Pat. No. 9,381,902, which is a continuation of U.S. patent application Ser. No. 13/897,209, filed on May 17, 2013, and entitled "ABSOLUTE ACCELERATION SENSOR FOR USE WITHIN MOVING VEHICLES", now patented as U.S. Pat. No. 8,725,380, which is a continuation of U.S. patent application Ser. No. 11/821,352, filed on Jun. 21, 2007, and entitled "ABSOLUTE ACCELERATION SENSOR FOR USE WITHIN MOVING VEHICLES", now patented as U.S. Pat. No. 8,532,896, which is a divisional of U.S. patent application Ser. No. 11/243,364, filed on Oct. 3, 2005, and entitled "ABSOLUTE ACCELERATION SENSOR FOR USE WITHIN MOVING VEHICLES", now patented as U.S. Pat. No. 7,239,953 which claims priority under 35 U.S.C. 119(e) of the U.S. provisional patent application, Application No. 60/616,400, filed on Oct. 5, 2004, and entitled "REAR-END COLLISION AVOIDANCE SYSTEM." The U.S. patent application Ser. No. 15/176,033, filed on Jun. 7, 2016, and entitled "ABSOLUTE ACCELERATION SENSOR FOR USE WITHIN MOVING VEHICLES," the U.S. patent application Ser. No. 14/263,629, filed on Apr. 28, 2014, and entitled "ABSOLUTE ACCELERATION SENSOR FOR USE WITHIN MOVING VEHICLES," the U.S. patent application Ser. No. 13/897,209, filed on May 17, 2013, and entitled "ABSOLUTE ACCELERATION SENSOR FOR USE WITHIN MOVING VEHICLES," the U.S. patent application Ser. No. 11/821,352, filed on Jun. 21, 2007, and entitled "ABSOLUTE ACCELERATION SENSOR FOR USE WITHIN MOVING VEHICLES," the U.S. patent application Ser. No. 11/243,364, filed on Oct. 3, 2005, and entitled "ABSOLUTE ACCELERATION SENSOR FOR USE WITHIN MOVING VEHICLES" and the provisional patent application, Application No. 60/616,400, filed on Oct. 5, 2004, and entitled "REAR-END COLLISION AVOIDANCE SYSTEM" are all also hereby incorporated by reference in their entireties.

FIELD OF THE INVENTION

The present invention relates generally to methods and devices for detecting absolute levels of longitudinal, lateral and vertical acceleration within moving vehicles, and to a variety of systems and methods for generating responses to changes in these absolute levels.

BACKGROUND OF THE INVENTION

Accelerometers find a wide variety of applications within modern motor vehicles. The most common of these are impact and collision sensors used to deploy front and side impact air bags in modern passenger cars and trucks.

In applications that depend on sudden and drastic deceleration, the presence of gravity is of little consequence and will not affect the implementation of the accelerometer. However, increasingly feedback systems within motor vehicles have attempted to make use of accelerometer data during much lower and subtler levels of acceleration.

One example is anti-collision warning systems. Though all street legal motor vehicles have brake lamps configured to signal other drivers of braking, these signals do not warn following drivers of imminent braking. At least one system has proposed activating a vehicle's brake lamp system in response to a deceleration signal from a sensitive accelerometer, and independent of actuation of the brake pedal. The system described in U.S. Pat. No. 6,411,204 to Bloomfield et al., entitled "DECELERATION BASED ANTI-COLLISION SAFETY LIGHT CONTROL FOR VEHICLE," includes a plurality of deceleration thresholds each with an associated modulation of the brake lamps.

However, the system fails to precisely account for gravitational forces, limiting its effectiveness to deceleration regimes where gravity's effect is minimal and reducing its effectiveness as an early warning system. Accelerometers, known as tilt sensors in the gaming and robotics industries, are extremely sensitive to any gravitational force to which they are not perpendicular. This sensitivity complicates any system that attempts to detect low levels of acceleration by using accelerometers within moving vehicles, since the system must account for the wide variety of orientations of the accelerometer relative to the earth's gravity introduced as the vehicle travels uphill, downhill, through cambered or off-camber curves, and on cambered grades. For instance, an accelerometer in a vehicle stopped on a 45-degree downhill slope would sense deceleration of a magnitude equal to 0.71 times the acceleration due to gravity. To avoid gravitational acceleration artifacts, the system of Bloomfield only produces output if the deceleration signal rises above a predetermined threshold set above the level of artifacts introduced during typical driving conditions.

However, the reliance of this device on a threshold deceleration reduces its effectiveness as an early warning system. Even a short delay between the time when the subject vehicle begins to slow down and the time when a following vehicle begins to slow can result in a rapid closure of the gap, or following distance, between the vehicles, and a potential collision. Consequently, the shorter the following distance between vehicles, the smaller the margin of error will be for drivers of following vehicles to avoid rear-end collisions. Disengaging the accelerator, or coasting, is often the first response of the driver of a subject vehicle to observing a non-urgent traffic event in the roadway ahead, and usually results in a slight deceleration. By failing to warn other drivers of the possible imminence of braking of a subject vehicle, the proposed device loses valuable time. To avoid this problem, the threshold must be set lower, which could result in gravitational acceleration artifacts affecting the system's output. For example, an overly low threshold could prevent the device from signaling deceleration on an uphill grade since the accelerometer would sense a component of the earth's gravity as acceleration. Similarly, a low threshold could cause the device to continuously flash during a descent, while gravity appears as deceleration.

The loss of time incurred by a threshold-based system might be tolerable in some other application; but in collision prevention, even an instant saved can prevent a collision. A Special Investigative Report issued in January of 2001 by the National Transportation Safety Board (NTSB) illustrates the scale of the problem. The report notes that in 1999 "1.848 Million rear-end collisions on US roads kill[ed] thousands and injur[ed] approximately [one] Million people." The report concluded that even a slightly earlier warning could prevent many rear-end collisions.

Regardless of the individual circumstances, the drivers in these accidents were unable to detect slowed or stopped traffic and to stop their vehicles in time to prevent a rear-end collision. If passenger car drivers have a 0.5-second additional warning time, about 60 percent of rear-end collisions can be prevented. An extra second of warning time can prevent about 90 percent of rear-end collisions. [NTSB Special Investigative Report SIR-01/01, *Vehicle-and Infrastructure-based Technology for the Prevention of Rear-end Collisions*]

SUMMARY OF THE INVENTION

In this application "acceleration" refers to either or both positive acceleration and negative acceleration (sometimes called "deceleration"), while "deceleration" refers to only negative acceleration.

The present invention relates to devices that overcome the limitations of the prior art by integrating signals from two separate sensors that have completely different references to construct a signal representing only actual acceleration, including deceleration, of the vehicle. The preferred embodiments use signals from both an accelerometer, which sometimes detects gravitational acceleration in addition to actual vehicle acceleration, and a gyroscope configured to sense deviations from the plane perpendicular to the earth's gravity. By modifying the signals from the accelerometer based on those from the gyroscope, the preferred embodiments monitor the absolute acceleration, including absolute deceleration, of the vehicle relative to the road.

The preferred embodiment of the present invention combines an integrated accelerometer and an integrated gyroscope, such as a rate gyroscope, in a single system that electronically integrates their signals to provide for highly accurate detection of absolute acceleration with no arbitrary thresholds required. Elsewhere, this portion of the present invention is referred to as an "accelerometer-g-sensor."

In one aspect, the present invention relates to a method of detecting absolute acceleration along various axes relative to a movement vector while moving relative to a gravity source, comprising: determining a vertical acceleration, perpendicular to the movement vector and substantially anti-parallel to a gravitational acceleration due to the gravity source; determining a longitudinal acceleration, parallel to the movement vector and to output a vertical acceleration signal and a longitudinal acceleration signal; determining an inclination of the movement vector relative to the gravitational acceleration; and processing the vertical acceleration signal, the longitudinal acceleration signal, and the inclination signal to produce an absolute vertical acceleration signal and an absolute longitudinal acceleration signal.

In another aspect, the invention relates to a system for detecting absolute acceleration along various axes relative to a movement vector while moving relative to a gravity source, comprising: a two-axis accelerometer configured to sense both a vertical acceleration, perpendicular to the movement vector and substantially anti-parallel to a gravitational acceleration due to the gravity source, and a longitudinal acceleration, parallel to the movement vector and to output a vertical acceleration signal and a longitudinal acceleration signal; a gyroscope configured to sense an inclination of the movement vector relative to the gravitational acceleration and to output an inclination signal; and a logic circuit configured to process the vertical acceleration signal, the longitudinal acceleration signal, and the inclination signal to produce an absolute vertical acceleration signal and an absolute longitudinal acceleration signal.

Rear End Collision

The present invention provides systems and methods for warning drivers of other vehicles of any possibility that a subject vehicle will brake and/or that the following vehicle may need to decelerate. This warning occurs earlier than warnings provided by traditional rear brake warning systems. The preferred embodiment of the present invention takes advantage of the existing conditioning of modern drivers to respond quickly to rear brake warning lamps by using these systems to convey new deceleration warnings. In one aspect, the present invention relates to a communication system for a vehicle. The communication system includes an absolute deceleration detector including an accelerometer, a gyroscope, and a control logic and configured to detect an absolute deceleration status of the vehicle, a braking system engagement detector to detect a braking status of the vehicle, an alerting device capable of signaling other drivers of a deceleration condition of the vehicle, and a control device coupled to the accelerometer-gyroscopic sensor, the throttle engagement detector, the braking system engagement detector, and the alerting device. In this configuration, the accelerometer-gyroscopic sensor sends signals to the control device and the control device operates the alerting device in a manner dependent on the deceleration status, the braking status, and the throttle status of the vehicle.

In another aspect, the present invention describes a method of alerting drivers in proximity to a vehicle of deceleration and braking of the vehicle. The method includes steps of sensing an apparent rate of deceleration of the vehicle, sensing an inclination of the vehicle relative to a gravitational acceleration, correcting the apparent rate of deceleration to account for an effect of gravitational acceleration to determine an absolute rate of deceleration of the vehicle, detecting a braking status of the vehicle, and emitting a signal to indicate that the vehicle is decelerating. In this aspect, the signal varies depending on the rate of deceleration, the braking status, and the throttle status of the vehicle.

In a third aspect, the present invention relates to a method of forming a communication system for a vehicle. The method comprises a step of adding a deceleration warning circuit to a brake lamp system of the vehicle coupled with the deceleration detection circuit. In this method, the deceleration detection circuit comprises a deceleration detector, wherein the deceleration detector detects any deceleration of the vehicle, a gyroscope, wherein the gyroscope detects an inclination of the vehicle relative to a gravitational acceleration, a logic circuit configured to determine an absolute deceleration from the deceleration of the vehicle and the inclination of the vehicle, a braking system engagement detector, wherein the braking system engagement detector any engagement of a braking system of the vehicle, wherein the throttle engagement detector detects any disengagement of a throttle of the vehicle, and a control device coupled to the accelerometer-gyroscopic sensor and the braking system engagement detector, wherein the accelerometer-gyroscopic sensor, the braking system engagement detector, and the throttle engagement detector send signals to the control device, and wherein the control device activates brake lamps of the vehicle if the throttle is disengaged.

DETAILED DESCRIPTION OF THE INVENTION

The present invention includes systems and methods for detecting absolute rates of acceleration of bodies moving relative to a gravitational acceleration. The preferred embodiment uses signals from both an accelerometer, which sometimes detects gravitational acceleration in addition to actual vehicle acceleration, and a gyroscope, which can sense deviations from the plane perpendicular to earth's gravity. By modifying the signals from the accelerometer based on those from the gyroscope, the preferred embodiment monitors the absolute acceleration or deceleration of a vehicle relative to the road, or some other body relative to any object that is fixed relative to some gravity source that affects the body.

Figure 1A:
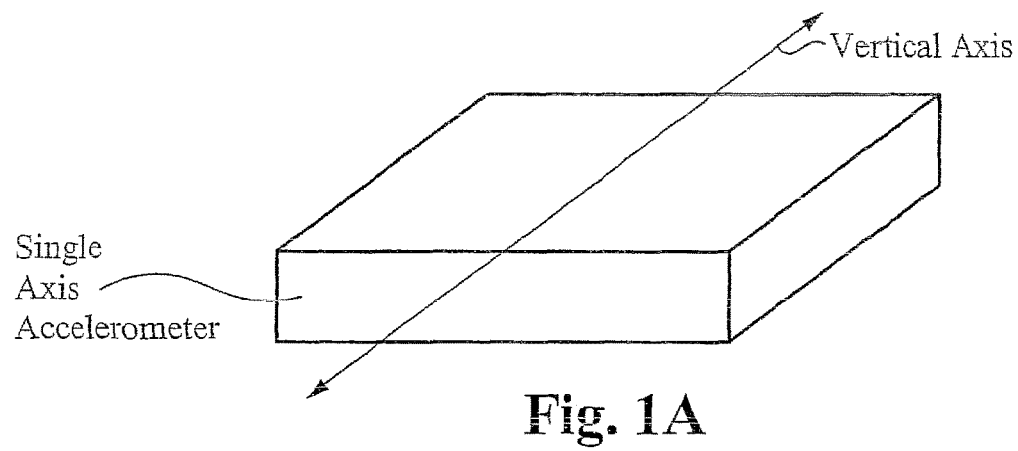
FIG. 1A illustrates a single axis accelerometer positioned for measuring lateral acceleration, and included in an accelerometer-gyroscopic sensor in accordance with an embodiment of the present invention.
Figure 1B:
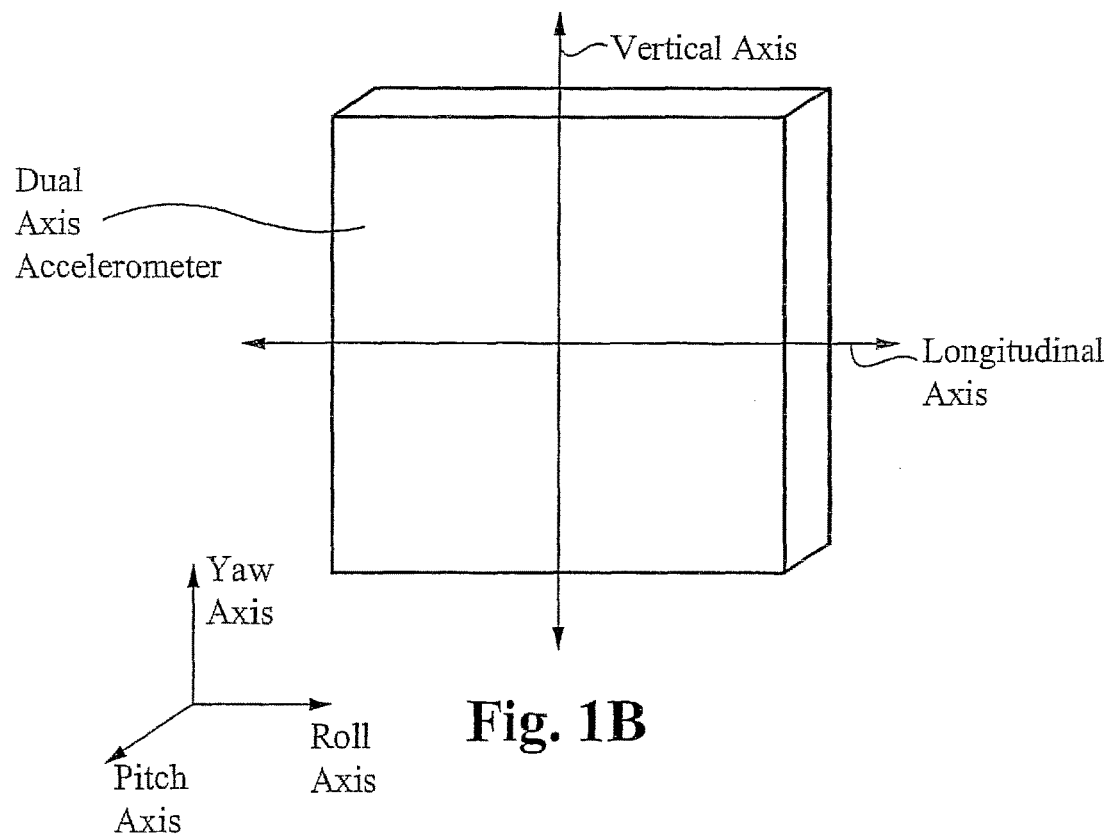
FIG. 1B illustrates a dual axis accelerometer positioned for measuring vertical and longitudinal acceleration, and included in an accelerometer-gyroscopic sensor in accordance with an embodiment of the present invention.
Figure 2A:
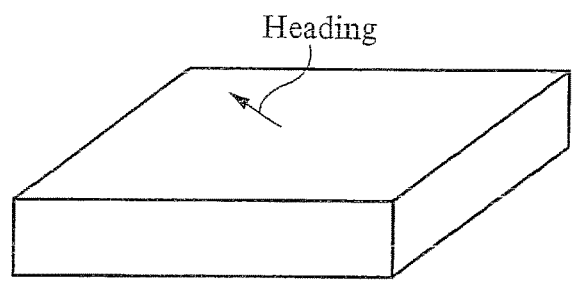
FIG. 2A illustrates a gyroscope positioned for measuring a heading, and included in an accelerometer-gyroscopic sensor in accordance with an embodiment of the present invention.
Figure 2B:
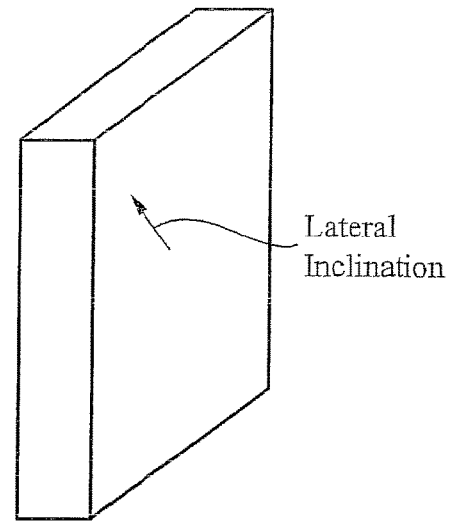
FIG. 2B illustrates a gyroscope positioned for measuring a lateral inclination, and included in an accelerometer-gyroscopic sensor in accordance with an embodiment of the present invention.
Figure 2C:
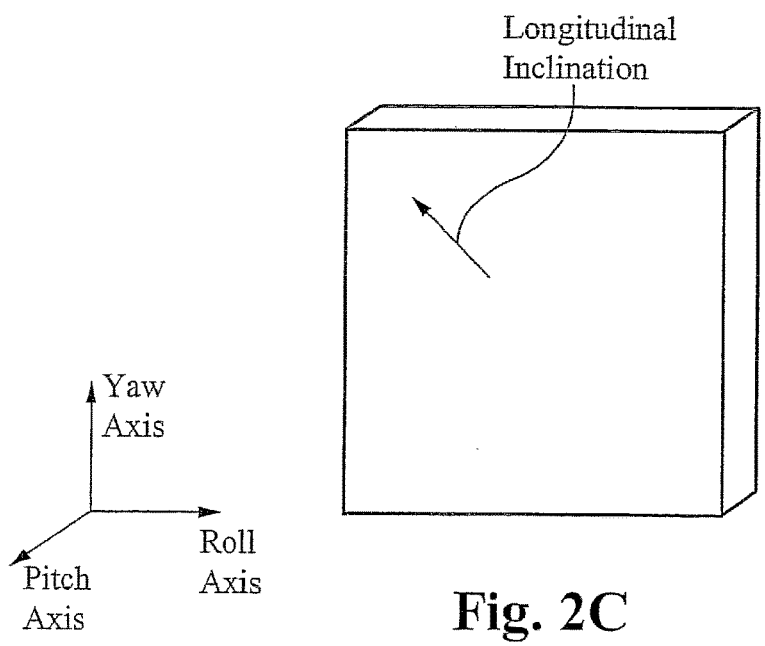
FIG. 2C illustrates a longitudinal inclination, and included in an accelerometer-gyroscopic sensor in accordance with an embodiment of the present invention.

As shown in FIGS. 1B and 2C, the preferred embodiment of the present invention includes a dual axis accelerometer and an electronic gyroscope positioned upon a moving body (not shown) having a pitch axis and a yaw axis that form a pitch-yaw plane as illustrated, which attempts to move along a movement vector orthogonal to the pitch-yaw plane. A first axis, termed the longitudinal axis, of the dual axis accelerometer is placed orthogonal to the plane of the pitch and yaw axes to sense acceleration along the movement vector. A second axis, termed the vertical axis, of the accelerometer is placed parallel with the yaw axis (and thus perpendicular to the movement vector) to sense acceleration along the yaw axis. Thus the two axes of the accelerometer form a longitudinal-vertical plane orthogonal to the pitch-yaw plane.

The gyroscope in FIG. 2C is mounted parallel to the longitudinal-vertical plane of the accelerometer and thus is also along a plane perpendicular to the pitch-yaw plane of the moving body. This configuration allows it to sense an inclination of the movement vector of the moving body relative to the gravitational acceleration acting on the body.

In some embodiments of the present invention, additional gyroscopes and accelerometers are mounted on the moving body at other orientations. Output from these additional sensors is useful for anti-roll suspension adjustment, among other things. The orientations shown in FIGS. 1A and 2B allow for detection of lateral acceleration and inclination. In FIG. 1A, a single axis accelerometer configured with a first axis, termed the lateral axis, parallel to the pitch axis senses lateral acceleration of the body, e.g. acceleration in a plane orthogonal to the longitudinal-vertical plane.

When the body does undergo a lateral acceleration, its actual movement is no longer along the desired movement vector. Thus, during lateral acceleration, another gyroscope must be included to sense the inclination of the component of the actual movement vector that lies along the lateral axis. FIG. 2B depicts a gyroscope configured parallel to the pitch-yaw plane and thus configured to detect an inclination of the component of movement that lies along the lateral axis, termed the lateral inclination of the body.

In some embodiments, the system also includes another gyroscope that is configured parallel to the lateral-longitudinal plane (in which all desirable movement vectors will lie), to detect a heading of the body. This additional gyroscope is required for those embodiments that supply supplemental data to navigation systems.

Preferably, the embodiments of the present invention include logic circuits configured to receive signals of acceleration along the lateral, longitudinal, and vertical axes, as well as of the lateral and longitudinal inclinations and the heading, and to process these signals to produce a variety of output signals indicating characteristics of the moving body's movement. These preferably include: absolute longitudinal acceleration (both positive and negative), absolute vertical acceleration (both positive and negative), absolute lateral acceleration (both positive and negative), heading, and actual speed.

Though accelerometers are inherently stable, and especially so when internally temperature compensated, gyroscopes, both mechanical and electronic, can suffer from instability and drift. Because of these drift characteristics, gyroscopes typically require periodic auto-zeroing or re-referencing to provide reliable output.

In some embodiments of the present invention, a method of detecting an absolute deceleration includes steps of re-referencing. This task is preferably accomplished using signals from the accelerometers, but in other embodiments use a Hall effect, electronic or other type of compass.

Re-referencing preferably takes place periodically; for systems using Hall effect or some other independent compass, the systems simply re-reference at specified heading or timing intervals. However, systems that use accelerometer data for re-referencing are preferably more careful. When stationary, any signal from the accelerometer is essentially representative of the earth's gravity, this signal can provide an initial reference for any gyroscopes included in the present invention, which preferably takes place prior to movement of the body.

Once the body has begun moving, without periodic re-referencing, the gyroscope output can become unreliable. The present invention teaches several methods of re-referencing during travel. Some of these are only applicable to travel that includes periodic stops. For example, the vertical or lateral axis accelerometers can be used to detect whether the body is stopped. When it is stopped, the signal from the longitudinal axis of the accelerometer can be used to re-reference the gyroscope. Further, at any point during travel when no acceleration has been detected for a predetermined period of time the gyroscope can be re-referenced. In this way repeated referencing can occur even during extended travel without any stops.

The present invention is preferably implemented in a vehicle, and the following embodiments of the present invention are described relative to a vehicle. However, the methods and systems taught by the present invention can be implemented in a wide variety of moving bodies other than vehicles. Further, for convenience, the devices described above with reference to FIGS. 1A, 1B, 2A, 2B, and 2C are termed an "accelerometer-gyroscopic sensor" when referenced elsewhere.

Example 1: Rear End Collision Avoidance

Figure 3A:
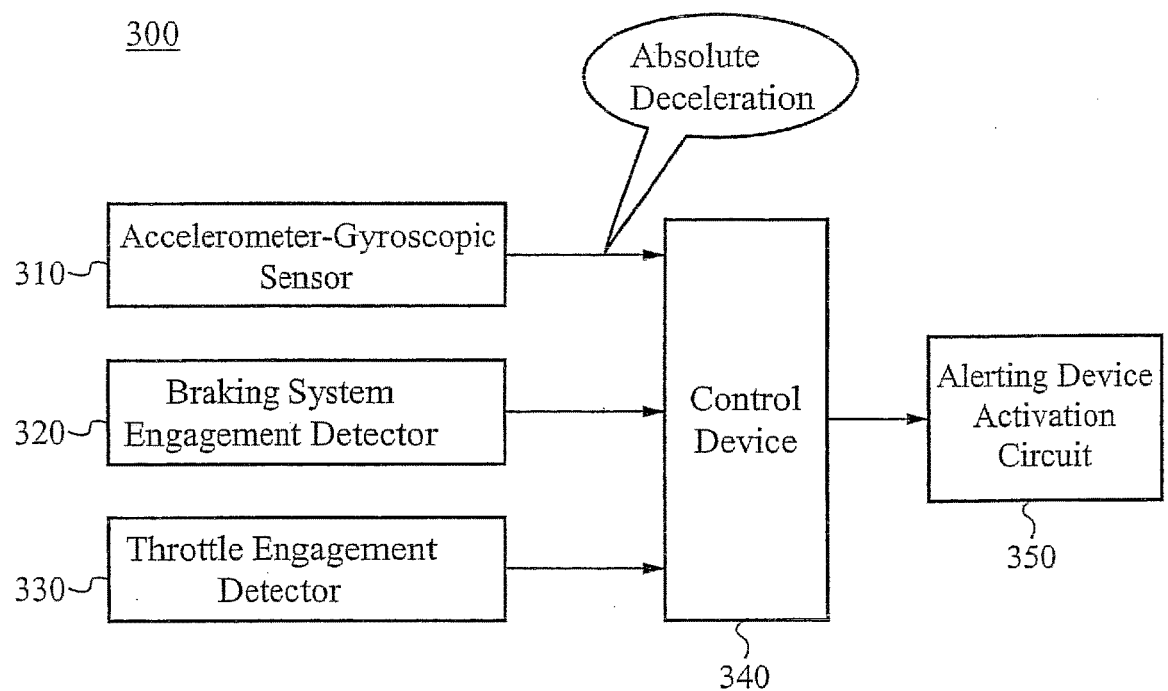
FIG. 3A is a schematic view illustrating the components of the rear-end collision avoidance system, warning drivers of a subject vehicle's deceleration, in accordance with an embodiment of the present invention.

FIG. 3A is a schematic view illustrating the components of the rear-end collision avoidance system 300, warning drivers of a subject vehicle's deceleration, in accordance with one embodiment of the present invention. The rear-end collision avoidance system 300 comprises an accelerometer-gyroscopic sensor 310, a braking system engagement detector 320, a throttle engagement detector 330, and a control device 340. The accelerometer-gyroscopic sensor 310 is coupled to the control device 340, detects an absolute longitudinal deceleration of the vehicle, and sends a signal to the control device 340. The braking system engagement detector 320 is also coupled to the control device 340, detects any engagement of the braking system of the vehicle, and sends a signal to the control device 340. The throttle engagement detector 330 is also coupled to the control device 340 and detects engagement of the throttle. In alternative embodiments, the present invention also includes additional input devices, such as a clutch engagement detector configured to relay a clutch status to the control device 340. Next, the control device 340 processes the input signals it receives from the accelerometer-gyroscopic sensor 310, the braking system engagement detector 320, and the throttle engagement detector 330 and decides whether to activate an alerting device of the vehicle. In some embodiment the control device 340 only activates an alerting device if the vehicle is throttled down but not braking In some embodiments, the control device 340 activates the alerting device only if the absolute longitudinal deceleration is non-zero. In one embodiment, the communication system further comprises an alerting device activation circuit 350, wherein the control device 340 is coupled to and sends signals to the alerting device activation circuit 350, which activates an alerting device based on a signal from the control device 340.

The embodiments of the present invention include input devices. Those mentioned above include braking system engagement detectors, throttle engagement detectors, and the accelerometer-gyroscopic sensor. In alternative embodiments, the present invention also includes additional input devices, such as a clutch engagement detector configured to relay a clutch status to the control device.

The embodiments of the present invention include alerting devices. In the present invention, an alerting device preferably comprises lamps on the vehicle that are capable of flashing and emitting visible light. In one aspect, the lamps of the alerting device flash only at a constant rate, while in another aspect the lamps flash at a variable rate, and further wherein the control device is configured to flash the lamps at a rate correlated to a rate of deceleration. The lamps are preferably one of the following: conventional signaling lamps and conventional brake lamps. However, in another embodiment, the alerting device is a radio frequency (RF) transmitter capable of directing RF signals from the rear of the vehicle to a following vehicle. In other embodiments, the alerting device uses other types of signals.

When used in this patent, the terms "conventional signaling lamps" and "conventional brake lamps" refer to signaling or brake lamps included on motor vehicles during their original manufacture. The present invention also contemplates signaling by using after-market devices that are attached to a vehicle in addition to conventional signaling and brake lamps.

A communication system can be embodied as an aftermarket add-on product or as an original vehicle system. These embodiments include different types of controllers. In an add-on system, a control device preferably does not interfere with the existing brake lamp system controller. The control device communicates with the brake lamps in a substantially separate manner from the existing brake lamp control system. Control devices used in the present invention could include relays, switches or micro controllers. In one aspect, an aftermarket system can continuously power the alerting device activation circuit without need of an intermediate control device.

However, in an original equipment system, a communication system in accordance with the present invention preferably includes a control device that further comprises a control system for the conventional brake lamp system, whereby the communication system is an integrated control and circuitry system for all brake lamps. In this aspect, a single control system accomplishes the tasks of conventional brake signaling and the signaling described in the present invention.

During operation, the communications system of the present invention uses information from the various input devices to determine a manner in which to operate an alerting device. In one aspect, the communications system continuously modulates the alerting device based on the accelerometer-gyroscopic sensor's input so long as the throttle is disengaged, regardless of braking system status. In another aspect, once the braking system is engaged, the communications system activates the alerting device continuously until disengagement of the braking system, whereupon the communications system once again considers throttle and the accelerometer-gyroscopic sensor's input in choosing a manner in which to operate the alerting device. In a third aspect, where a conventional braking system exists separately from a communications system as described in the present invention, the control device deactivates in response to braking system engagement and reactivates upon braking system disengagement. Preferably, the control device receives input in cycles and makes a determination for operation of the alerting device within each cycle.

In one embodiment, the control device 340 takes input from the accelerometer-gyroscopic sensor 310, the braking system engagement detector 320, and the throttle engagement detector 330 in cycles that are substantially continuous in time. In the preferred embodiment, for each cycle, the control device 340 enters one of four states: I) it does not activate an alerting device for the entirety of the cycle, II) it activates an alerting device for the entirety of the cycle, III) it activates an alerting device at least once for a period of time that is short relative to the duration of the cycle; or IV) it activates an alerting device multiple times during the cycle.

Figure 3B:
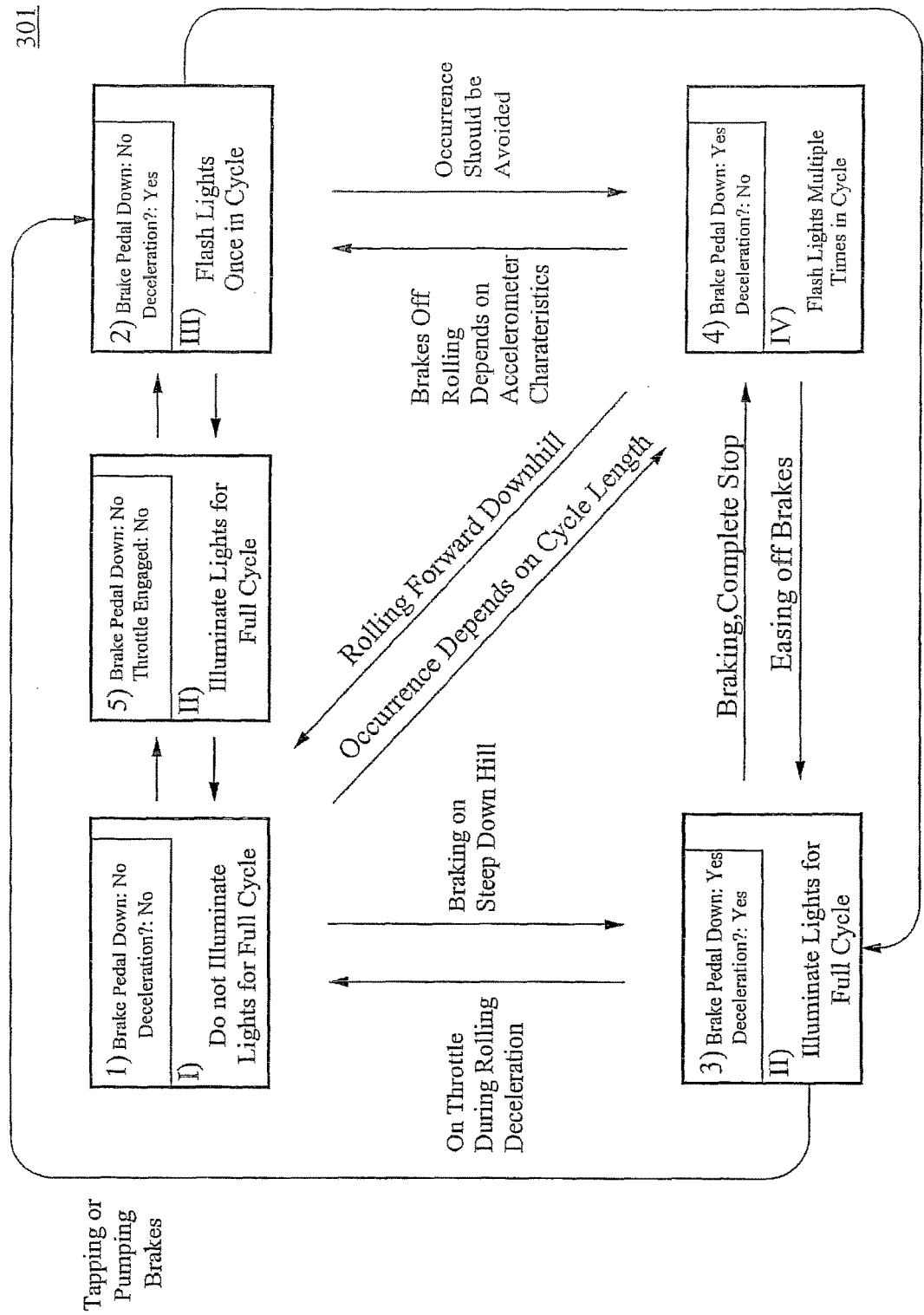
FIG. 3B illustrates a state machine diagram of the control device in accordance with the preferred embodiment of the present invention.

FIG. 3B illustrates a preferred embodiment in which these four output states are handled. A state machine 301, included in a control device in accordance with the present invention, takes five possible input states, for four of them throttle status is not considered: 1) brake pedal is not depressed, absolute deceleration is not detected; 2) brake pedal is not depressed, absolute deceleration is detected; 3) brake pedal is depressed, absolute deceleration is detected; or 4) brake pedal is depressed, absolute deceleration is not detected. State 5) only occurs if the throttle is disengaged, and if the brake pedal is not depressed. Input state 1 corresponds to output state I, input state 2 corresponds to output state III, input states 3 and 5 correspond to output state II, and input state 4 corresponds to output state IV.

Transitions between all input states are handled and every transition is a plausible outcome of a braking or acceleration event. For example, a driver disengaging the throttle pedal causes a transition from state 1 to state 5. In the first cycle detecting state 5, the brake lamps are illuminated. Once a required level of absolute deceleration is detected, a transition from state 5 to state 2 occurs. In the first cycle detecting state 2, the brake lamps are flashed, or another alerting device is activated, corresponding to output state III. A transition from state 1 directly to state 2 can occur when beginning ascent of a steep grade: the throttle is engaged, the brake pedal is disengaged but the vehicle begins to decelerate.

If the driver engages the throttle again, or in the case of an ascent, increases the throttle, a transition from state 5 to state 1, or state 2 to state 1, occurs. If the driver subsequently depresses the brake pedal, a transition from state 2, or state 5, to state 3 occurs. While the brake pedal is depressed, state II output keeps the brake lamps illuminated. Furthermore, while the brake pedal is depressed, a transition from state 3 to state 4 may occur. In this embodiment, in state 4 the lamps are flashed at an increased rate. Whenever the brake pedal is depressed, state II or IV output occurs and accelerometer-gyroscopic sensor data is effectively ignored. When the brake pedal is released, one of input state 1, input state 2, and input state 5 are entered.

A transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

Figure 3C:
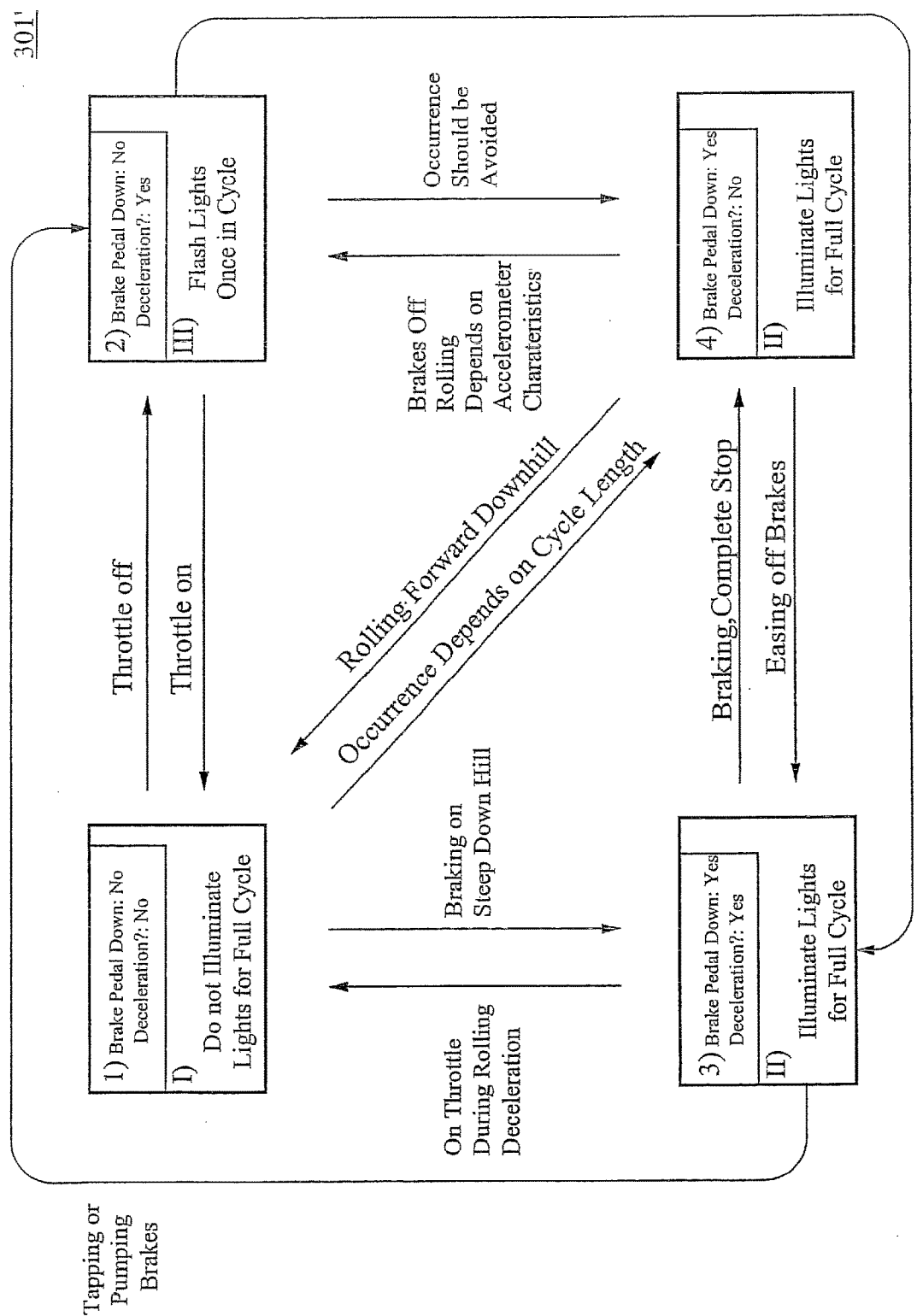
FIG. 3C illustrates a state machine diagram of the control device in accordance with an alternative embodiment of the present invention.

In the alternative embodiment illustrated in FIG. 3C, a state machine 301' included in a control device in accordance with the present invention, the system only considers the first three states. The state machine 301' takes four possible input states: 1) brake pedal is not depressed, absolute deceleration is not detected; 2) brake pedal is not depressed, absolute deceleration is detected; 3) brake pedal is depressed, absolute deceleration is detected; or 4) brake pedal is depressed, absolute deceleration is not detected. Input state 1 corresponds to output state I, input state 2 corresponds to output state III, and input states 3 and 4 correspond to output state II.

Transitions between all input states are handled and every transition is a plausible outcome of a braking or acceleration event. For example, a driver taking his or her foot off the accelerator pedal causes a transition from state 1 to state 2. In the first cycle detecting state 2, the brake lamps are flashed, or other alerting means are activated, corresponding to output state III. This transition from state 1 to state 2 also occurs when beginning ascent of a steep grade: the accelerator is depressed, the brake pedal is disengaged but the vehicle begins to decelerate. If the driver presses the accelerator again, or in the case of an ascent, further depresses the accelerator, a transition from state 2 to state 1 occurs. If the driver subsequently depresses the brake pedal, a transition from state 2 to state 3 occurs. While the brake pedal is depressed, state II output keeps the brake lamps illuminated. Furthermore, while the brake pedal is depressed, a transition from state 3 to state 4 may occur. In this embodiment, such a transition results in no change in output. Whenever the brake pedal is depressed, state II output occurs and accelerometer-gyroscopic sensor data is effectively ignored. When the brake pedal is released, either input state 1 or input state 2 is entered.

Transitions between states in this embodiment are similar to those in the preferred embodiment. A transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

Embodiments of the present invention provide the driver of a subject vehicle a communication system that provides warning signals to other vehicles of any absolute deceleration or possibility of braking of the subject vehicle. One novel and distinguishing feature of this invention is that the subject vehicle's communication system warns other vehicles of any possibility that the subject vehicle will begin to brake. This is so because any engagement of the brake pedal is usually immediately preceded by a disengagement of the throttle.

Thus, this invention provides an earlier warning to the driver of the following vehicle of a subject vehicle's intent to decelerate than is currently available in modern vehicles, which only provide systems that actuate warning lamps if the driver depresses the brake pedal or if an accelerometer unit detects a threshold deceleration. Modern drivers respond quickly to rear brake warning lamps, conditioning that the present invention takes advantage of by using these warning systems to convey new and broader warnings. Since following distances on modern roadways are often inadequate, this arrangement could prevent numerous rear-end collisions.

Example 2: Anti-Rollover Systems

In one embodiment of this invention, outputs from the sensing of absolute lateral acceleration are used to adjust suspension systems by stiffening outside suspension and/or loosening inside suspension of moving vehicles. When lateral acceleration or force is applied to a vehicle, it tends to lean in the direction opposite to the force being applied, due in part to the softness of their suspension systems. This moves the center of gravity further off center and in some cases outside of their wheelbase approaching the critical rollover point. Stiffening the outside suspension and/or loosening the inside suspension keeps the center of gravity of vehicles within a tighter envelope relative to the wheelbase. This inversely affects the propensity, especially in high center of gravity loaded vehicles, to rollover when the center of gravity of their load exceeds the wheelbase and reaches the critical rollover point. Additionally, by adjusting the suspension system in this manner the distribution of load between left and right side wheels is kept more even resulting in improved traction.

Typically these are configured as pulse width modulated (PWM) controlling devices. Such devices typically accept analog voltage level inputs, which are then converted to a corresponding pulse width output. Such outputs are a common method of controlling and delivering a regulated amount of current to a device such as a hydraulic solenoid. The hydraulic solenoids of course are responsible for increasing, decreasing or maintaining pressure levels within the hydraulic or pneumatic suspension system.

Figure 4:
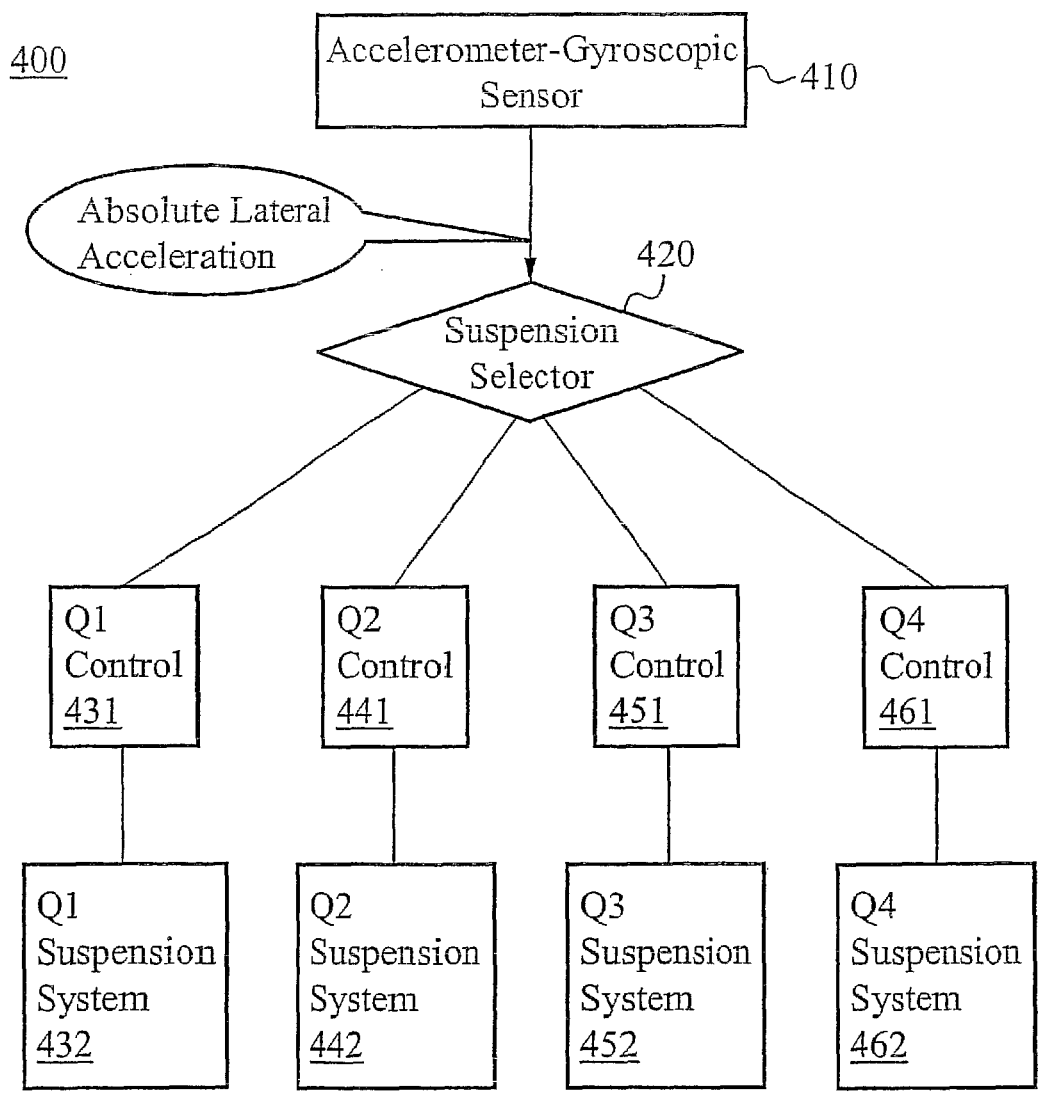
FIG. 4 illustrates a schematic view of an anti-rollover system in accordance with an embodiment of the present invention.

An anti-rollover device 400 is illustrated in FIG. 4. In this embodiment vehicles are assumed to be equipped with adjustable suspension systems, typically hydraulic or pneumatic. When absolute lateral acceleration is sensed the accelerometer-gyroscopic sensor 410 sends a signal representing absolute lateral acceleration to a suspension selector 420, which passes signals along to a controller responsible for controlling the relevant quadrant of the suspension. The suspension selector 420 must interpret the signal to determine the appropriate quadrant. For example, Q1, in which suspension system 432 is controlled by suspension control 431 could be the right front wheel; Q2, in which suspension system 442 is controlled by suspension control 441 could be the left front wheel; Q3, in which suspension system 452 is controlled by suspension control 451 could be the right rear wheel; and Q4, in which suspension system 462 is controlled by suspension control 461 could be the left rear wheel. Of course, other orderings are possible, as are systems with only two independent zones, e.g. two sides are controlled in lockstep.

Example 3: Performance Monitoring Systems

Due to fuel efficiency goals and competitive pressures late model vehicles have the ability to monitor engine system performance through an array of sensors and detectors. The absolute accelerometer/gyroscope combination provides the ability to communicate actual power-to-the-ground data for use in engine/vehicle performance computations. In this embodiment, the accelerometer-gyroscopic sensor continuously sums absolute acceleration values to provide both absolute acceleration and actual speed values, which can be used by a manufacturers vehicle computer unit (VCU).

Figure 5:
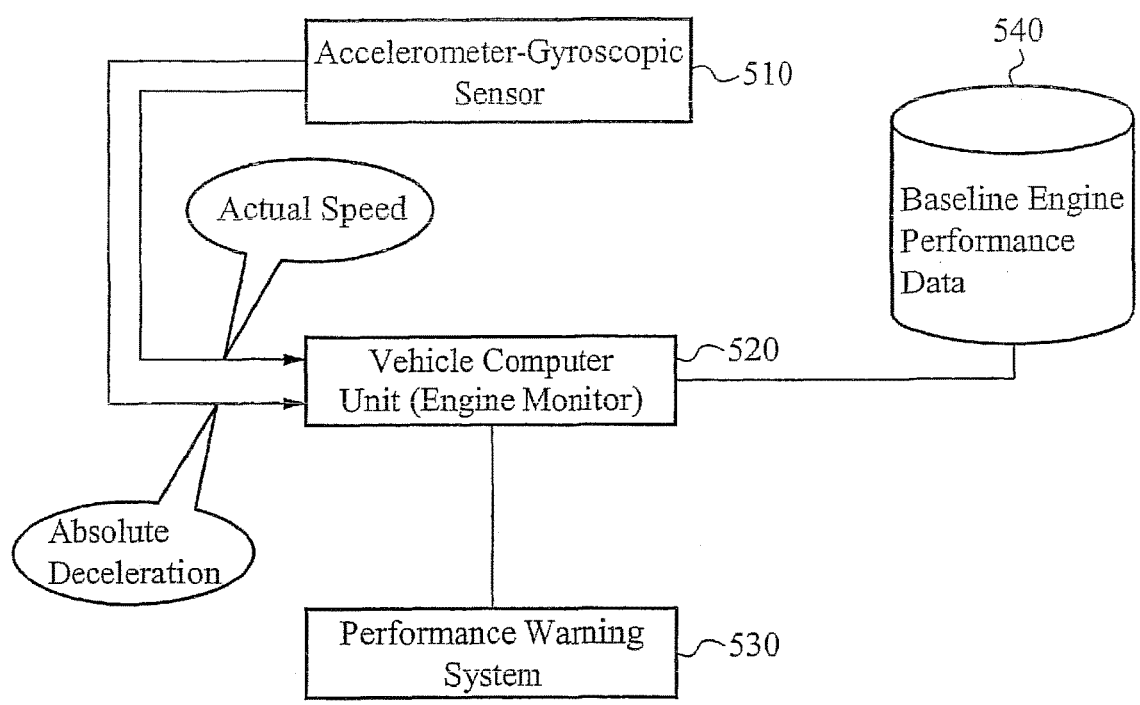
FIG. 5 illustrates a schematic view of an engine performance monitoring system in accordance with an embodiment of the present invention.

For example, the system 500 shown in FIG. 5 includes the accelerometer-gyroscopic sensor 510, which delivers actual speed data and absolute acceleration data to a vehicle computer unit (VCU) 520 (or at least the engine monitoring portion thereof). The VCU 520 uses baseline engine performance data 540 to either self-correct through a feedback mechanism, or to issue a warning through the performance warning system.

The manufacturer's baseline engine performance data is helpful in determining how much acceleration should be achieved for a given amount of throttle and what the speed of the vehicle should be for a given amount of throttle. For instance, a VCU may have tuned to maximum efficiency however the vehicle's corresponding speed or acceleration may be many percentage points less than what would be expected, indicating perhaps that the tire pressure is low or that the vehicle is loaded to a higher level than what would be normal, in which case the tire pressure should be increased.

Example 4: Road or Suspension Condition Monitoring Systems

Because an accelerometer-gyroscopic sensor, which is used and is part of this invention can use one axis of a dual axis accelerometer in the vertical position vertical acceleration output signals are made available to other monitors or computers that require this information. Such a requirement may be to monitor and evaluate road quality and/or shock absorber utilization and performance. For instance, it is apparent to a rider in a vehicle when such vehicle is riding on worn out shock absorbers. However, it becomes less apparent when those shock absorbers wear out slowly over an extended period of time. The first time a driver may realize that shock absorbers have worn out is in cases where critical performance is required. Or when they replace worn out tires and see the evidence on tires of worn out shock absorbers. The absolute A/G sensor detects vertical acceleration in very small increments. Increasing levels of vertical acceleration can easily be monitored thus providing notice to drivers of the degradation of shock absorber system.

Figure 6:
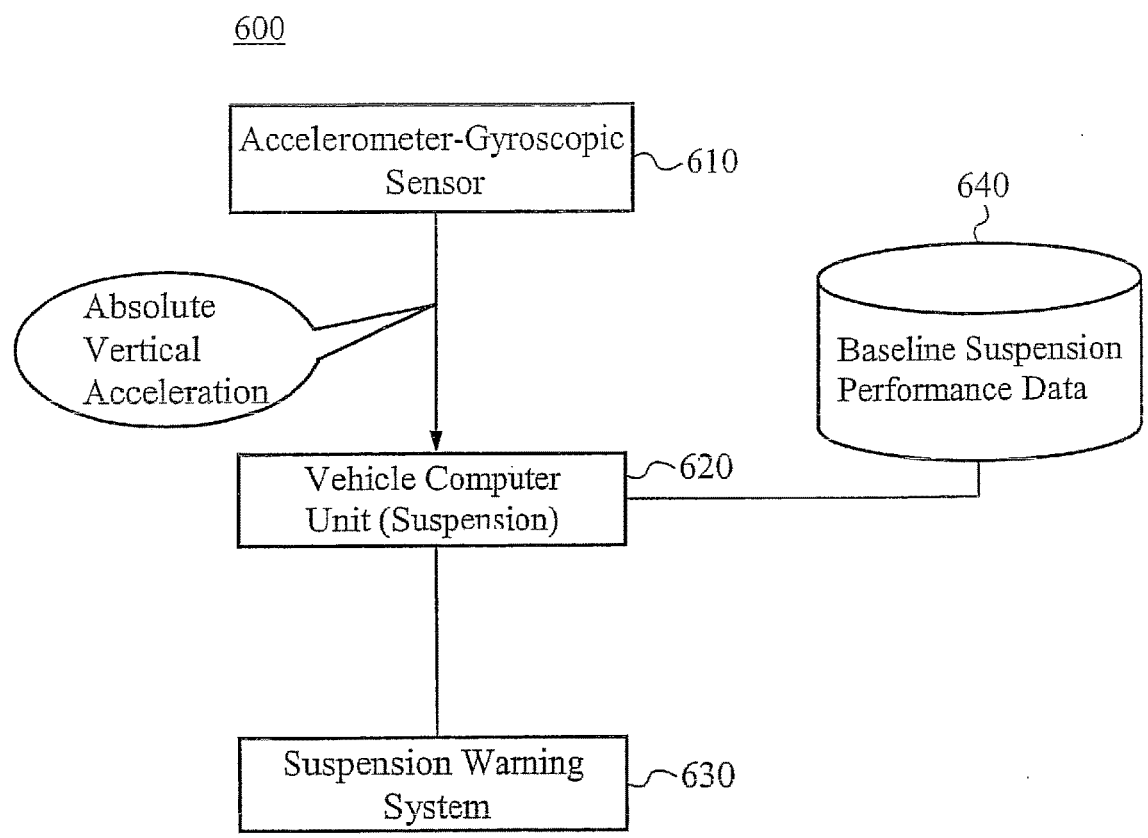
FIG. 6 illustrates a schematic view of a suspension and road condition monitoring system in accordance with an embodiment of the present invention.

For example, in the system 600 shown in FIG. 6, the accelerometer-gyroscopic sensor 610 provides absolute vertical acceleration data to a VCU 620 or at least a suspension-monitoring portion thereof. The VCU 620 can use baseline suspension performance data 640 to either self-correct through a feedback mechanism or issue a warning through the suspension warning system 630.

Example 5: Navigation Systems

In most embodiments, the accelerometer-gyroscopic sensor is continuously monitoring acceleration; a unit of acceleration multiplied by a unit of time yields a unit of velocity (with speed as its magnitude). Preferably, the accelerometer-gyroscopic sensor continuously sums units of acceleration over small increments of time. In this case, the accelerometer-gyroscopic sensor provides the integrated velocity or speed as an output. Preferably, when a horizontally mounted gyroscope is incorporated, the accelerometer-gyroscopic sensor also provides direction or heading as an output.

Figure 7:
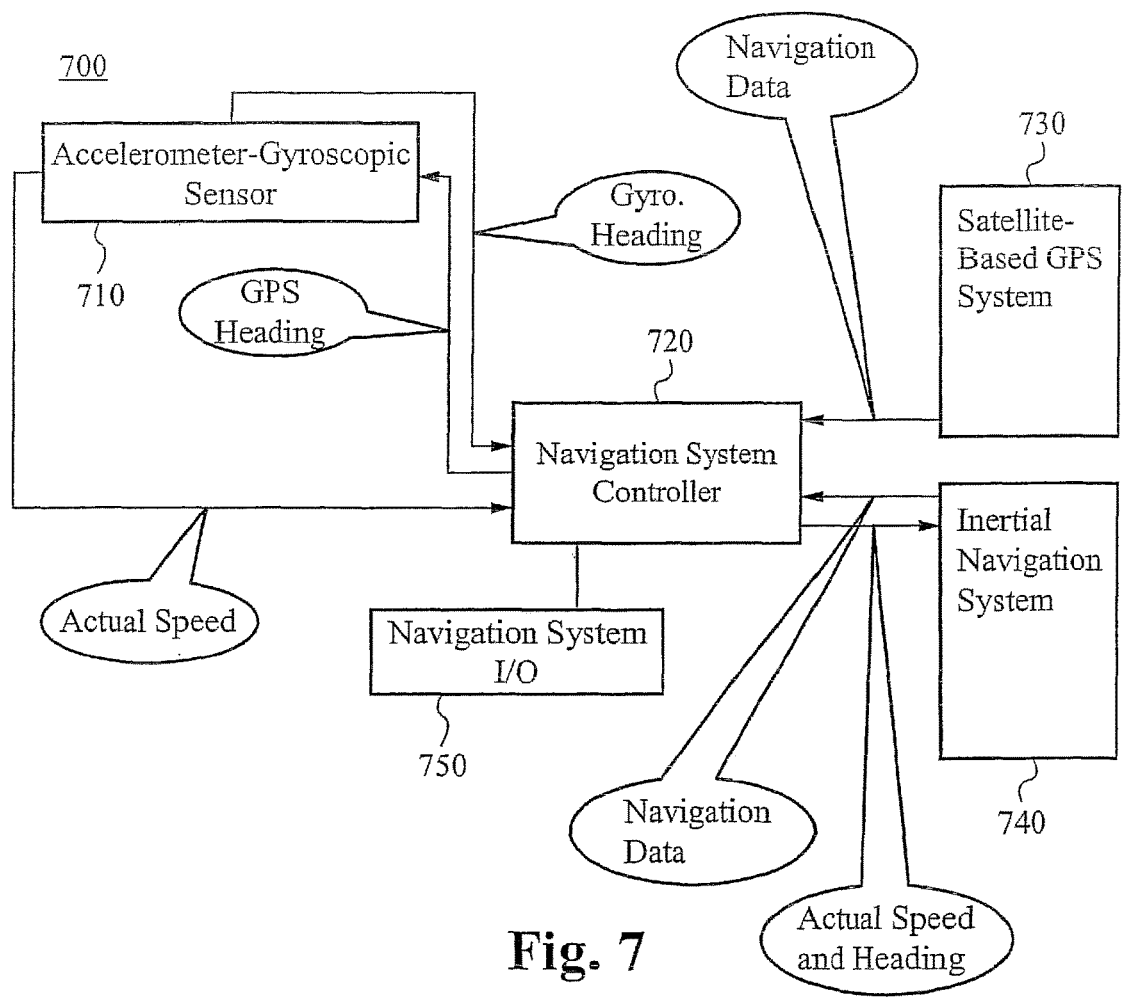
FIG. 7 illustrates a navigation system in accordance with an embodiment of the present invention.

Because velocity, or speed and heading are the raw elements required for inertial navigation systems. In the system 700 shown in FIG. 7, the accelerometer-gyroscopic sensor 710 provides actual speed and heading information as an output to a navigation system controller 720. The navigation system controller 720, which normally provides navigation data from a global positioning system (GPS) 730 directly to the navigation system input/output (I/O) 750, incorporates heading information from the accelerometer-gyroscopic sensor 710 during periods of connection loss with the GPS satellite system. In return for providing the heading data to the inertial navigation system 740, the navigation controller receives navigation data from the inertial system to supplement or replace its GPS data.

Preferably, the navigation system controller 720 also provides GPS heading data back to the accelerometer-gyroscopic sensor 710 to permit re-referencing of the gyroscopes contained therein. Continuous referencing and re-referencing of the horizontally mounted gyroscope utilize GPS heading values while satellite signals are acquired. Once satellite signals are lost gyroscopic heading values take priority using last known valid headings from the GPS. This method using absolute A/G values for supplementing data to the GPS data when the GPS system has lost signal will find use in many applications outside of the automotive industry.

These elements in output signal format are made available to on board GPS based navigation systems through a data port for supplementation during periods of lost or down satellite signals so that the user of a GPS navigation system sees no down time during these periods.

In another aspect, since speed or velocity can be tracked by summing positive and negative accelerations and multiplying by time, a second multiplication by time can yield distance, which is also useful in navigation.

Example 6: Altimeter Systems

In another aspect, summing positive and negative vertical accelerations over time yields altitude. For example, an instrument, including an accelerometer-gyroscopic sensor, placed in an airplane or other flying object, contains a circuit that continuously sums over all accelerations and outputs altitude. Alternatively, a system including an accelerometer-gyroscopic sensor included in a non-flying vehicle tracks changes in altitude and outputs a signal used to vary engine performance or some other type of parameter.

This method of altitude determination has certain advantages over current methods of determining altitude which rely on either radar, pressure sensors, or GPS triangulation. Of course its accuracy in determining altitude above sea level (ASL) relies on knowledge of initial altitude, and its accuracy in determining altitude above ground level (AGL) relies on terrain maps or something similar. Since this type of instrument would reveal nothing about a changing ground level below an aircraft, any aircraft equipped with it would still require a radar altimeter for determining AGL on instrument approaches that require such.

Of course, the present invention has additional uses that are not discussed in the embodiments above. The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent that those skilled in the art that modifications can be made to the embodiments chosen for illustration without departing from the spirit and scope of the invention.

We claim:

1. A supplemental GPS System, the system comprising:
   a. an accelerometer-gyroscopic sensor configured to output heading data of an object and a velocity of the object;
   b. an inertial navigation system; and
   c. a navigation system controller that receives the heading data and the velocity of the object from the accelerometer-gyroscopic sensor and sends the heading data and the velocity of the object to the inertial navigation system,
   wherein the inertial navigation system receives the heading data and the velocity of the object from the navigation system controller and outputs navigation data for the object, wherein the system is configured to provide navigation data during periods of connection loss with a GPS satellite system, and wherein the GPS satellite system takes priority when available.

2. The system of claim 1, wherein the inertial navigation system sends the navigation data of the object to the navigation system controller, which provides the navigation data of the object to a navigation system input/output.

3. The system of claim 1, wherein the navigation system controller sends a GPS heading data from the GPS satellite system to the accelerometer-gyroscopic sensor to enable re-referencing of one or more gyroscopes.

4. The system of claim 1, wherein the navigation data comprises a position of the object.

5. The system of claim 1, wherein the system is implemented within a vehicle.

6. A method of supplementing a GPS system, the method comprising:
   a. detecting a velocity of an object;
   b. detecting a heading of the object;
   c. based on the velocity of the object and the heading of the object, outputting navigation data for the object, wherein the system is configured to provide navigation data during periods of connection loss with a GPS satellite system, and wherein the GPS satellite system takes priority when available.

7. The method of claim 6 comprising providing the navigation data of the object to a navigation system input/output.

8. The system of claim 6, wherein the navigation system controller sends a GPS heading data from the GPS satellite system to the accelerometer-gyroscopic sensor to enable re-referencing of one or more gyroscopes.

9. The system of claim 6, wherein the navigation data comprises a position of the object.

10. The system of claim 6, wherein the system is implemented within a vehicle.

11. A navigation system for a vehicle, the navigation system comprising:
    a. an accelerometer-gyroscopic sensor configured to a output a heading data and a velocity of the vehicle;
    b. a GPS satellite system;
    c. an inertial navigation system;
    d. a navigation system input/output; and
    e. a navigation system controller that receives a signal from one of the accelerometer-gyroscopic sensor and the GPS satellite system based on an availability of the GPS satellite system and sends a signal to one of the navigation system input/output and the inertial navigation system, wherein the accelerometer-gyroscopic sensor sends the heading data and the velocity of the vehicle to the navigation system controller during periods of connection loss with a GPS satellite system, and wherein the GPS satellite system takes priority when available.

12. The system of claim 11, wherein the navigation system controller sends the heading data and the velocity of the vehicle to the inertial navigation system, and wherein the inertial navigation system receives the heading data and the velocity of the object from the navigation system controller and outputs navigation data for the object.

13. The system of claim 12, wherein the inertial navigation system sends the navigation data of the object to the navigation system controller, which provides the navigation data of the object to a navigation system input/output.

14. The system of claim 11, wherein the navigation system controller sends a GPS heading data from the GPS satellite system to the accelerometer-gyroscopic sensor to enable re-referencing of one or more gyroscopes of the accelerometer-gyroscopic sensor.

15. The system of claim 11, wherein the navigation data comprises a position of the object.

16. A method of determining and using data describing absolute acceleration along various axes relative to a desired movement vector while moving relative to a gravity source and summing absolute accelerations for determining a geographic position comprising:
   a. determining a lateral acceleration, perpendicular to the desired movement vector using an accelerometer;
   b. determining a longitudinal acceleration, parallel to the desired movement vector using the accelerometer;
   c. determining an inclination of the desired movement vector relative to a gravitational acceleration using an accelerometer-gyroscopic sensor;
   d. determining an absolute lateral acceleration from the lateral acceleration by subtracting a portion of the lateral acceleration which is due to the force of gravity as determined by the inclination of the desired movement vector using a navigation system controller;
   e. determining an absolute longitudinal acceleration from the longitudinal acceleration by subtracting a portion of the longitudinal acceleration which is due to the force of gravity as determined by the inclination of the desired movement vector using the navigation system controller; and
   f. producing the geographic position using the navigation system controller determined by one or more of the absolute lateral acceleration, the absolute longitudinal acceleration and the inclination of the desired movement vector, wherein the geographic position is utilized during periods of connection loss with a GPS satellite system, and wherein the GPS satellite system takes priority when available.

17. A method of determining a geographic position within a moving vehicle comprising:
   a. processing acceleration data from an accelerometer;
   b. processing inclination data from a gyroscope;
   c. determining an absolute acceleration data by removing a portion of the acceleration data which is due to the force of gravity as determined from the inclination data from the gyroscope; and
   d. summing the absolute acceleration data to determine geographic position vector, wherein the geographic position is utilized during periods of connection loss with a GPS satellite system, and wherein the GPS satellite system takes priority when available.

18. A device for using data for determining and summing absolute acceleration along one or more axes relative to a desired movement vector while moving relative to a gravity source for the purpose of determining a geographic position of a moving vehicle, the device comprising:
   a. one or more accelerometers configured to sense a longitudinal acceleration, parallel to the desired movement vector and a lateral acceleration perpendicular to the desired movement vector and perpendicular to a gravitational acceleration and to output a longitudinal acceleration signal and a lateral acceleration signal;
   b. a gyroscope configured to sense an inclination of the movement vector relative to the gravitational acceleration and to output a longitudinal inclination signal and a lateral inclination signal;
   c. a logic circuit configured to process the longitudinal acceleration signal, the lateral acceleration signal, the longitudinal inclination signal and the lateral inclination signal, and to produce an absolute longitudinal acceleration signal, an absolute lateral acceleration signal, an absolute longitudinal inclination signal and an absolute lateral inclination signal; and
   d. a microprocessor configured to receive one or more of the absolute longitudinal acceleration signal, the absolute lateral acceleration signal, the absolute longitudinal inclination signal and the absolute lateral inclination signal and to produce a geographic position of the vehicle determined at least in part by at least one of the absolute acceleration signals and the absolute inclination signals that it receives, wherein the geographic position is utilized during periods of connection loss with a GPS satellite system, and wherein the GPS satellite system takes priority when available.

* * * * *